United States Patent [19]

Fisher

[11] Patent Number: 4,766,589
[45] Date of Patent: Aug. 23, 1988

[54] DATA TRANSMISSION SYSTEM

[75] Inventor: David A. Fisher, Saffron Walden, United Kingdom

[73] Assignee: STC PLC, London, England

[21] Appl. No.: 749,063

[22] Filed: Jun. 26, 1985

[30] Foreign Application Priority Data

Jul. 11, 1984 [GB] United Kingdom ............... 8417661

[51] Int. Cl.⁴ .............................................. H04L 5/14
[52] U.S. Cl. ........................................ 370/32; 370/98; 379/408
[58] Field of Search ............... 370/32, 74, 98, 32.1; 375/111, 113, 120, 107, 117; 455/51; 379/408, 410, 411

[56] References Cited

U.S. PATENT DOCUMENTS

| | | | |
|---|---|---|---|
| 2,965,717 | 12/1960 | Bell | 370/74 |
| 3,401,342 | 9/1968 | Becker | 370/74 |
| 3,404,231 | 10/1968 | Aaron et al. | 375/113 |
| 3,772,598 | 11/1973 | Van Gerwen | 375/111 |
| 4,103,234 | 7/1978 | Frazier, Jr. | 375/111 |
| 4,209,664 | 6/1980 | Hochrath | 370/74 |

Primary Examiner—Robert L. Griffin
Assistant Examiner—M. Huseman
Attorney, Agent, or Firm—Lee & Smith

[57] ABSTRACT

In a data transmission system data is sent, after suitable conversion, as a ternary analog type signal. Using two-wire twisted pairs and hybrids, echo cancellation and feedback equalization are needed.

Synchronization between the two ends, e.g. of a 144 Kb/sec. subscriber's loop is maintained by a low amplitude pilot tone sent with the data, and detects at the same time as the data is detected. Detection and elimination of this pilot tone use coefficient generation circuitry similar to those used in the equalizer and echo canceller.

6 Claims, 6 Drawing Sheets

PHASE DISCRIMINATOR (PILOT TONE ONLY TRANSMISSION)

Fig.6.

DATA TRANSMISSION SYSTEM

This invention relates to a data transmission system, and is described herein as applied to a full duplex 144 Kb/s subscriber loop transmission system.

According to the present invention there is provided a data transmission system in which the data to be transmitted is in digital form and is transmitted over the line in an analogue form, in which to maintain synchronisation between the ends of the system a pilot tone is sent in addition to the data to be sent, in which the pilot tone has an amplitude which is small compared with the amplitude of the data signal, the pilot tone frequency having a fixed and known relation to the data bit rate, so that the addition of the pilot tone does not increase bandwidth, in which sampling of the data signal is effected under control of a local clock, in which adjustment of the local clock is effected in response to the detected pilot tone, which detection is effected concurrently with the sampling and detection of the data signals, and in which the local clock is compared with the received and detected pilot tone, the timing of the local clock being adjusted in accordance with the results of said comparison to maintain synchronisation.

The system described herein which embodies the invention is similar in many respects to that of U.S. Pat. No. 4,539,675 (D. A. Fisher), with the exception of the timing extraction method and the addition of a specific start-up procedure. The method of timing extraction is applicable with very little modification to any baseband PCM application, but is particularly advantageous when applied to the full duplex system described in the above Patent Specification for the following reasons:

(a) Timing information may be added to the transmission code without increasing the code baud rate. Hence the transmission code needs no redundancy for clock extraction.

(b) The only performance penalty is the power needed to transmit the pilot tone, which in the application to be described is one twentieth of the power used for data transmission. The pilot tone does not degrade the detection process.

(c) Adjustment of the timing phase, i.e. the time at which the data bits are sampled, is based on a single sampler per baud. The phase relation between data and pilot is so arranged that the same sample is used for data detection. The sampling rate of a "front-end" analogue to digital converter and any signal processing prior to and including the receiver need only operate on one sample per baud.

(d) During start-up of the system, transmission of the pilot tone alone permits very rapid acquisition of the correct timing phase before any data is transmitted. This property is used to preset the master end of the system to a sampling phase which need not be changed for the duration of the connection. Under steady state conditions, the pilot tone need only be transmitted in the master-to-slave direction.

(e) A mode of operation advantageous to system training can be used whereby the slave end is held in timing synchronisation by transmission of the pilot in the master to slave direction whilst transmitting data in only the master to slave or slave to master direction.

(f) The pilot tone is easily eliminated from data at the master end by a single tap in the echo canceller adaptive filter.

(g) The pilot phase is easily estimated at the slave receiver by a single tap in the decision feedback equaliser adaptive filter.

It will be seen that the present arrangement is a development of a clock extraction method of our British Patent Specification No. 2082025B, the main claim of which reads as follows:

"A clock pulse extraction and pilot tone elimination circuit for use in a digital transmission system, in which the digital signal as received is accompanied by a pilot tone the frequency of which has a predetermined relation to the digital bit rate, in which the incoming signal is applied to a sample and hold circuit which samples the signal at the transmitted bit rate or an integral multiple thereof, the output from the sample and hold circuit being applied to one input of a subtractor circuit, in which the incoming signal is also applied via a filter tuned to the pilot tone frequency to a phase locked loop whose output is a clock signal at a frequency which has a preset relation to the incoming pilot tone frequency, in which the clock signal is applied to a plurality of coefficient generation circuits each of which derives an adaptive coefficient from the digital signal output and the clock signal, the clock signal being applied to the coefficient generation circuits with different time delays (one of which may be zero), and in which the coefficient signals from the coefficient generation circuits are applied to a summation circuit, the summated signals being applied to the other input of the subtraction circuit, the arrangement being such that the output of the subtraction circuit, which is the digital output, is the digital signal as received but without the pilot tone."

Embodiments of the invention will now be described with reference to the accompanying drawings, which show the application of the invention to a 144 Kb/s subscriber's loop. In these drawings.

In a system using the present invention there are two ends, the master end being the one with a master oscillator which controls the PCM transmission rate, the other or slave end being synchronised to the master end by a clock synchronisation circuit. There are two basic modes of operation, training and the steady state. The steady state mode is simpler and is described first.

During steady state operation pilot tone transmission only occurs in the master to slave direction and the master end sampling phase is fixed. The signal flow in this direction is described with reference to FIGS. 1 and 2 which show schematically the transmitter and slave receiver component parts of the echo cancelling transmission system. In these figures, only those parts of the respective stations relevant to the present invention are shown. In the reverse slave to master direction the pilot is only used during training and the slave pilot transmission circuit and master pilot recovery circuits are inoperative.

Figure 1:
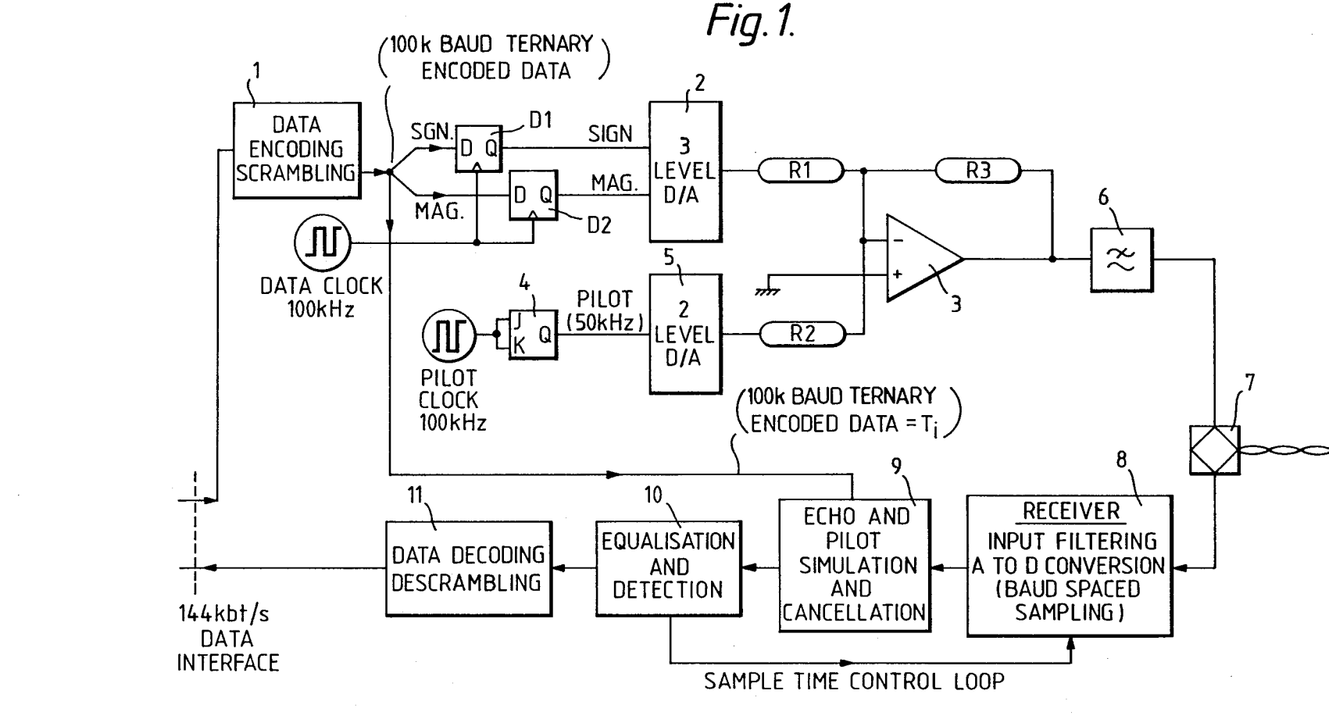
FIG. 1 is a simplified block diagram of the master station of a system embodying the invention, and which includes details of an analogue method for pilot tone addition.

The transmitter circuit for the master station is shown in FIG. 1. In this implementation the data baud rate as transmitted is $f_o = 100$ kHz, and ternary non-return to zero pulse shaping is used. The relationship between the data clock of frequency $f_o = 100$ kHz and sample data is given in FIGS. 3A and 3B respectively. The code employed is 3B2T, as referred to in U.S. Pat. No. 4,539,675 (D. A. Fisher), with the exception that the synchronisation word in the present arrangement is of length five symbols occuring every 120 data symbols and is either 11110 or 11112, assuming the same symbol notation as the patent specification just mentioned.

Figure 3:
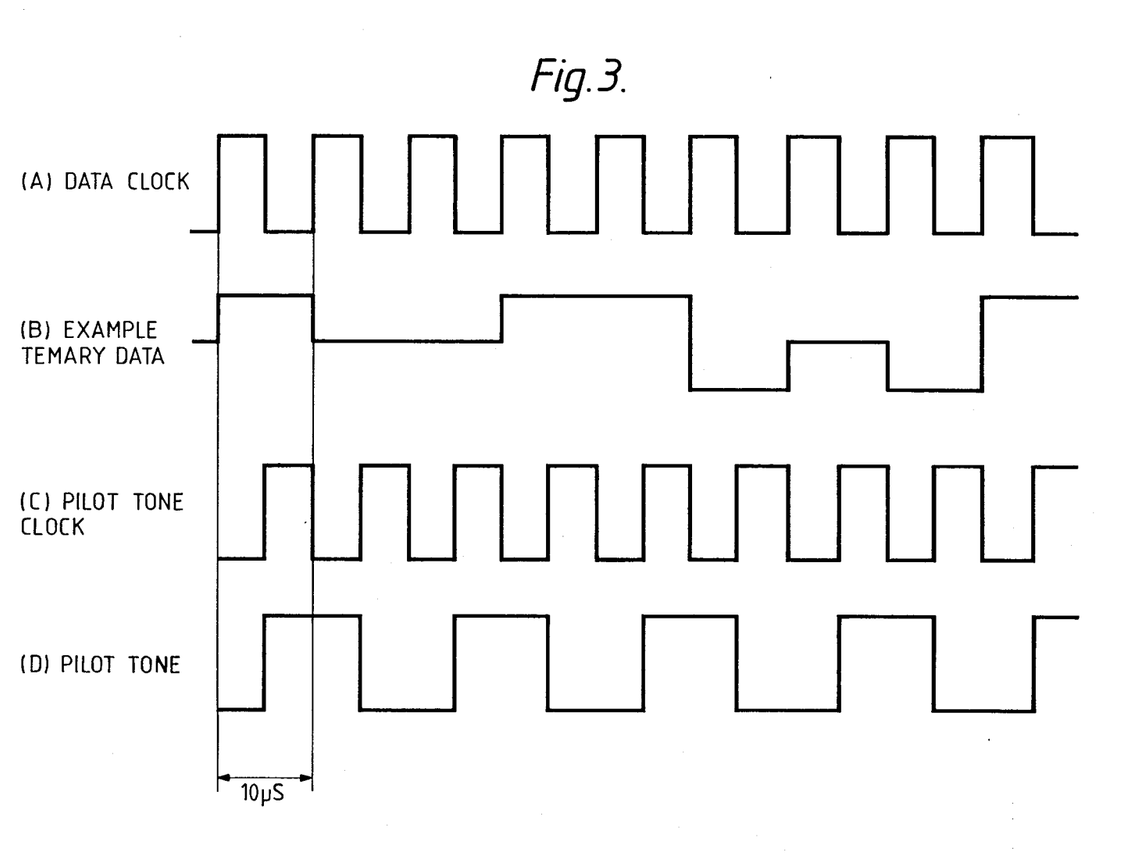
FIG. 3 is a waveform diagram showing the relation between data, data clock, pilot tone clock and pilot tone waveforms.

The pilot tone, FIG. 3D, is a squarewave of frequency $f_o/2 = 50$ kHz, and the phase relationship between the data and the pilot tone is such that transitions of the pilot occur midway between transitions of the data waveshape. The pilot tone clock is given in FIG. 3C and the pilot tone itself is produced by division of the pilot tone clock by two. In general, the PCM data signal shape must have even symmetry, and at the point of addition the zero crossings of the $f_o/2$ pilot tone must coincide with the centre of the transmitted PCM signal shape. In addition, the pilot tone must have odd symmetry about its zero crossing and must contain energy at the half symbol rate.

Addition of the pilot tone to the PCM data is done either in the analogue domain using an operational amplifier as indicated in FIG. 1, or in the digital domain using for example, a twos complement number representation of the data signal and pilot amplitude.

The peak amplitude of the pilot tone is scaled to be one quarter of the peak amplitude of the PCM data signal at the point of addition in the 144 kbt/s subscriber loop case. This ratio is not critical and is chosen to suit the parameters of the data receiver and data channel.

A low pass filter is placed between the pilot addition circuit and the transmission buffer amplifier for controlling the transmitted data spectrum so as to limit interference. This low pass filter may be either a linear phase or minimum phase design with either analogue or digital implementation. In the case of a digital implementation of the circuit a digital to analogue converter is then required to generate the signal for transmission.

The composite signal is then transmitted onto the cable through a linear resistive hybrid coupling network.

We now consider FIG. 1 in more detail. The incoming data signal is applied to a data encoding/scrambling arrangement 1 which eliminates auto-correlation in the transmitted data and cross-correlation between the two directions of transmission. The encoding produces an output in ternary form at 100K baud, which corresponds to 144 kb/s binary form. This output is applied to two data latches (D1) and (D2), one (D1) for data sign and the other (D2) for data magnitude. The outputs of these two latches control a three level digital-/analogue converter 2, the output of whih passes via a resistor R1 to one input of an operational amplifier 3.

The pilot tone is derived from the pilot clock, which runs at 100 kHz (and is phase locked to the data clock), via a divide by two circuit 4 the output of which goes to a two-level digital to analogue converter 5. The output of this converter 5 is applied via another resistor R2 to the amplifier 3, so that the pilot tone is added to the data signal. The combined signal is applied via a low pass filter 6 to a resistive hybrid 7, and therefrom to the line.

In the incoming direction the received signal from the line is applied via the hybrid 7 to a receiver block 8. This includes input filtering, analogue to digital conversion, with baud spaced sampling the control of which will be described later.

The output of the block 8 goes to an echo and pilot simulation and cancellation block 9, which has a second input from the outgoing or GO path. This is to provide echo cancellation, needed because in practice the hybrid is imperfect and allows some break through of the GO signal to the receive side. This second input enables the break-through signal to be cancelled.

The output from the block 9 goes to the block 10, which provides equalisation and detection of the time at which sampling should be effected. The result of this detection controls the block 8 via the sample time control loop connection. The output from the block 10 goes to a data decoding and descrambling block 11 the output of which is the 144 Kb/s data.

Figure 4:
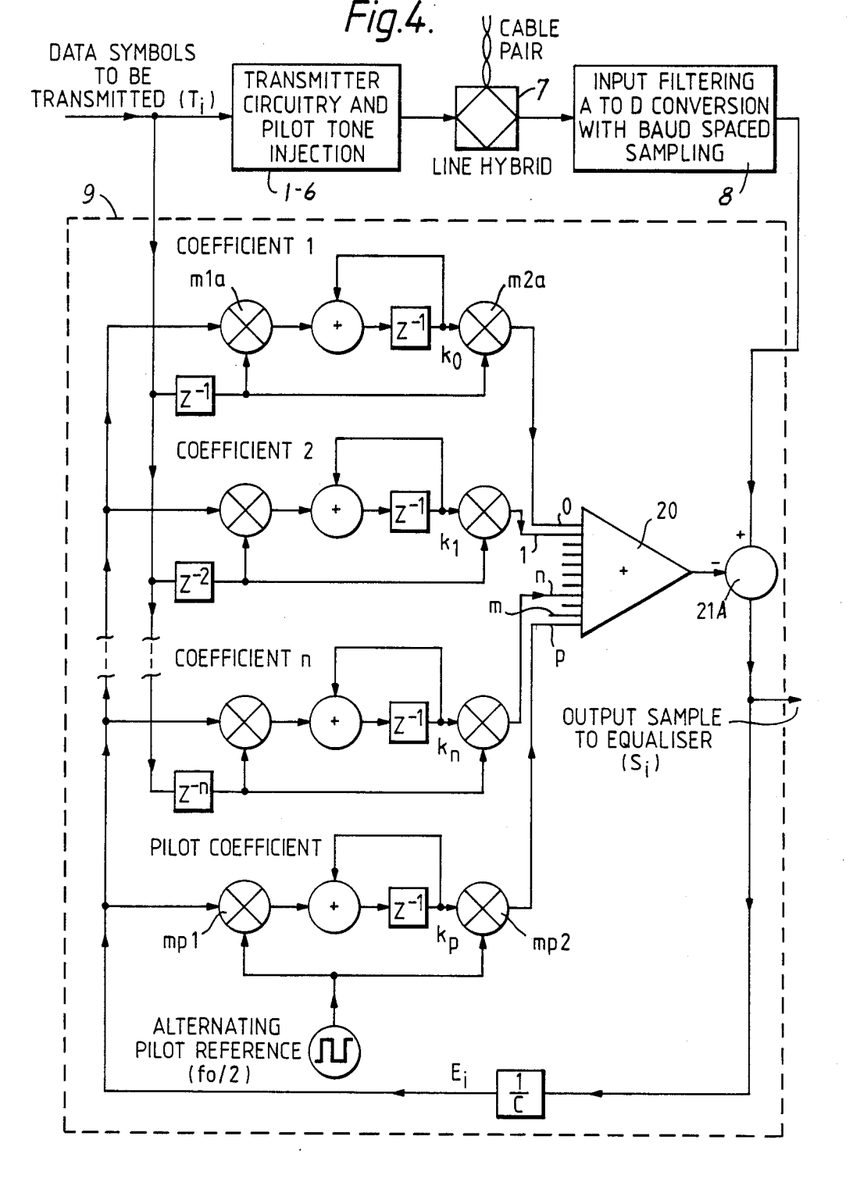
FIG. 4 is a schematic diagram of a canceller configuration used in a system embodying the invention, which includes the provision of a coefficient for pilot tone elimination.

The operation of the echo canceller in block 9 to remove the local signal component of the received sampled data signal follows the principles of U.S. Pat. No. 4,539,675 (D. A. Fisher) referred to above. In the present system however, the relationship between the transmission clock and the receiver clock at the master end is frozen before the echo canceller is activated. This eliminates the need to introduce circuitry to cater for the cancellation discontinuity which occurs when the canceller data input clock and receiver sample clock cross over. The structure used therein, see FIG. 4, is modified to include an adaptive coefficient to eliminate the locally generated pilot tone. The method of adaption and the rate of adaption of this coefficient is the same as that used for all of the other coefficients, and it adapts the coefficient by an assessment proportional to the estimated gradient of the coeffient error. The arrangement shown in FIG. 4 is an echo canceller as used in block 9 of FIG. 1. The echo cancellation portions of the blocks 23 and 30 of FIG. 2 can also use the same principles as the arrangement shown in FIG. 4. In this arrangement the assembly formed by mp1, kp and mp2 form the coefficient generation circuit used to deal with the pilot tone.

This echo simulator, FIG. 4, generates a signal to be subtracted from the received signal and which corresponds to the transmitted signal. The simulator is an adaptive transversal filter having a number of coefficients 1 to n and includes delay elements $Z^{-1}, Z^{-2}, \ldots Z^{-n}$, one for each of a number of previous bits. Each element feeds a system consisting of a first multiplier, e.g. m 1a, an accumulator e.g. Ko and a second multiplier, e.g. m 2a. The accumulator has a forward delay $Z^{-1}$.

The coefficient values are stored in the delay elements (Z exponent-1) as a twos complement number, and are multiplied by the delayed data symbols using the second multipliers and summated in the summation circuit 20, the output of which goes to the subtractor circuit 21A. The subtractor output forms the canceller output to the equaliser. This output is also scaled by 1/C and correlated with the corresponding symbol values in the first multipliers and used to increment the coefficient values stored in the delay elements. It will be seen that the delay elements in the coefficient generators are located in the feed-forward positions.

During steady state operation of adaption, the canceller is only required to track small changes in the substantially time invariant transhybrid impulse response. In this case the established sign updating variant of the adaption algorithm is appropriate whereby the coefficient value is incremented or decremented by its least significant bit dependent only on the sign of the first multiplier product. This reduces the coefficient accumulator to an up-down counter.

To cancel the locally generated pilot tone another coefficient generation circuit having a first multiplier mp1, an accumulator Kp and a second multiplier mp2 is used, see FIG. 4. This has its first multiplier "driven" by the output of the subtractor as for the other coefficient generation circuits, but its other input to the two multipliers comes from the local pilot tone, as shown. Thus the difference between this and the other coefficients is that the delayed transmitted data input to the multiplier is replaced by an input toggled at the pilot tone frequency of 50 KHz. It is a requirement of the system that the data be scrambled in each transmission direction to make the data in each direction appear random, and thus avoid incorrect adaption of any coefficient. The only non-random component at the pilot frequency of $f_o/2$ must therefore be due to the locally-transmitted pilot frequency.

Figure 2:
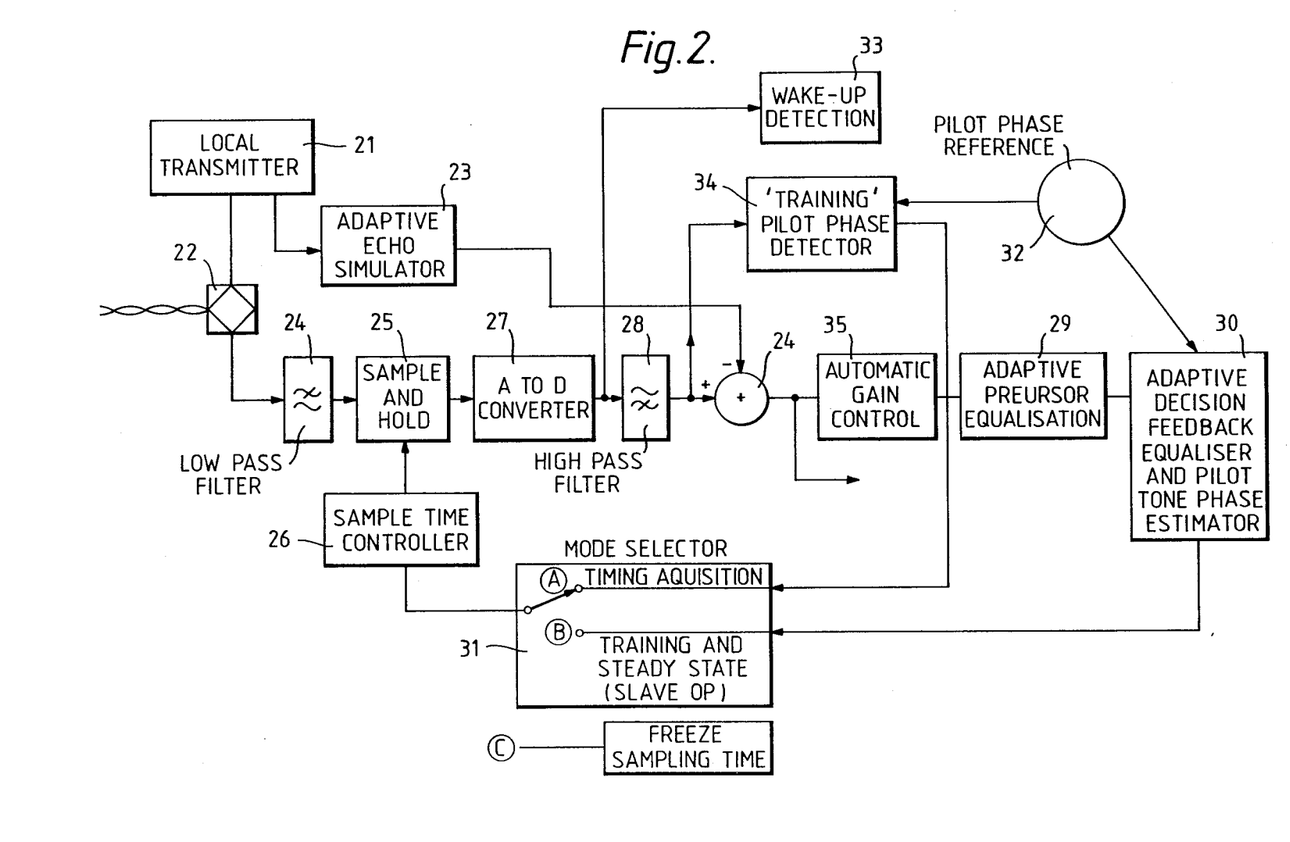
FIG. 2 is a simplified block diagram of the slave station of a system embodying the invention which includes details of the pilot tone extraction method.

We now turn to FIG. 2, which includes greater detail of the receive circuitry used at the slave station. Here the local transmitter 21, which supplies data signals to be sent to the master station, is connected to the hybrid 22, and also for echo cancellation purposes to an adaptive echo simulator 23. The output of this goes to a subtractor 36 which subtracts the "simulated" version of the outgoing data from the incoming signal from the loop.

The incoming signal passes from the hybrid 22 via low pass filter 24 to a sample and hold circuit 25, which samples each incoming data bit under control of a sample time controller 26. The output from the sample and hold circuit goes via an analogue-digital converter 27 and a high pass filter 28 to the subtractor 36. The output of this goes to an automatic gain control circuit. The output of this circuit 35 goes via an adaptive precursor equalisation block 29 to a block 30.

Block 30 is an adaptive decision feedback equaliser and pilot tone eliminator, which can be similar to the arrangement shown in FIG. 4. Its operations occur under the control of a pilot tone phase reference circuit 32. Its output forms one input of a mode selector 31, the input thereof which is used during normal operation of the system. During steady state operation at the slave station the electronic switch which forms the mode selector 31 connects the output of the block 30 to the sample time controller 26. Hence the equaliser, etc., block 30 controls the sampling times for the receive side of the slave end.

The receiver also includes a "wake-up" detection circuit 33, which responds to incoming signals, and is analogous to the conventional telephone bell.

The receiver also includes a "training" pilot phase detector 34, which determines incoming pilot tone phase from what the slave receives. This it does with reference to the local pilot phase reference 32, and the result of its detection is applied when in the training mode via the mode selector 31 to the controller 26. Hence this is effective when initially setting up the loop circuit.

The purpose of the timing extraction circuit is to adjust the time at which the composite received signal is sampled by the sample and hold circuit 25, which precedes the analogue to digital converter 27. Any linear signal conversion process equivalent to the combination of a low pass filter followed by an ideal sample and hold and analogue to digital conversion may be used.

In the steady state mode of operation data transmission and timing extraction have been established in both directions. Data plus pilot tone is being transmitted from MASTER to SLAVE end and data only from SLAVE to MASTER end. The slave end sampling phase is determined by dividing the frequency generated by the slave end crystal oscillator (not shown), which in the present system is 12.8 MHz, by 128 to give the 100 kHz. The slave end receiver sampling clock is always coincident with the slave end transmission clock.

Because the slave crystal oscillator frequency is subject to drift with respect to the MASTER end oscillator, to keep the 100 kHz clocks in synchronism it is necessary to periodically extend or reduce the time between the 100 kHz clock rising edges. Thus, if the sampling phase is found to have advanced relative to the incoming data the period between the nominally 100 kHz clock cycles is extended to 129 cycles of the 12.8 MHz clock. Conversely if the 100 kHz sample clock is found to be retarded the period is reduced to 127 12.8 MHz clock cycles.

This extension or reduction of the time between sampling clocks is made following the sampled input, which when processed by the slave echo canceller contains the first significant non-zero component of the transhybrid impulse response convolved with the final zero amplitude symbol of the frame synchronisation word. The synchronisation word is designed to be both unique and to contain several consecutive zero amplitude symbols.

For those samples immediately following a simultaneous shift in the transmit and sample time at the slave end, the echo estimate made by the echo canceller is in error by the sum of the convolution of the transmitted data with the differential of the transhybrid impulse response with respect to the phase change. The first four terms in the differential of the transhybrid impulse response contribute a large proportion of the error. These first terms can be removed by the cessation of transmission for a short period as described above by sending zero amplitude symbols. A synchronisation word containing four consecutive zero amplitude symbols which occur every 125 symbols is selected as well matched to the 144 kbt/s subscriber loop application with phase shifts of 1/128 symbol periods. Different rate systems using the same concept but different lengths or frequency of synchronisation word and phase shift are of course equally feasible.

The direction of adjustment of sampling phase is determined by whether at the sampling point the pilot tone zero crossing precedes or follows the sampling point. The purpose of the timing extraction is to adjust the position at which the signal is sampled to the point at which the pilot tone waveform crosses zero.

We now consider the phase discriminator for use during steady state operation. In this case data plus pilot tone is sent in the master to slave direction whilst data only is sent in the slave to exchange direction.

It is desirable to send the pilot tone at a lower level than the transmitted data signal. Thus while estimating the sampling point error relative to the zero crossing of the pilot tone using the demodulation and filtering technique already described, the estimate is noisy due to the larger random signal components at the pilot frequency generated by the remote data sequence.

An efficient solution to this problem is to combine the phase discriminator with a conventional adaptive decision feedback equaliser (ADFE) using an additional coefficient in a similar manner to that already described for the echo canceller.

In this case (FIG. 6), a coefficient is used in the ADFE to estimate the pilot tone sampled amplitude using the error/coefficient gradient estimation algorithm as defined by the signal flow diagram. The coefficient used differs from the normal ADFE coefficients in that the delayed data input to the coefficient is replaced by an input toggled by the receive sampling clock giving a 50 kHz square wave. When the ADFE is receiving data error free and is fully trained there is no noise enhancement in estimation of the pilot phase due to the superimposed data signal. Similarly, any small phase error resulting in a residual level of pilot tone superimposed on the data samples will be eliminated by the pilot tone tap in the equaliser.

Figure 6:
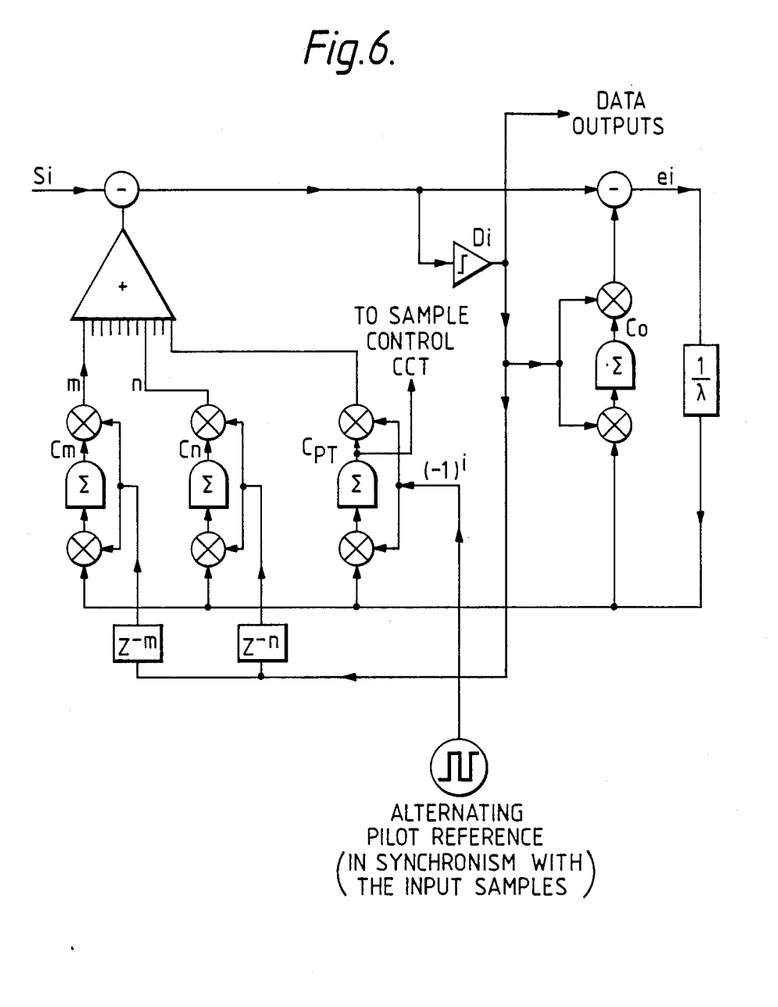
FIG. 6 shows schematically the addition of a pilot tap to the adaptive decision feedback equaliser, the purpose of which will be described below.

Operation of the equaliser on a sampled input signal is as described in the above-mentioned U.S. Pat. No. 4,539,675 (D. A. Fisher). Using the same notation as before, the additional pilot tap coefficient ($C_{PT}$) contributes to the value immediately prior to the decision such that $$d_i = S_i - \sum_{n=1}^{m} D_{i-n} C_n - (-1)^i C_{PT}$$

The pilot tap is updated $$C_{PT} = C_{PT} + \frac{e_i}{\lambda}(-1)^i$$

The sign of the coefficient is then used to control the direction of phase adjustment.

Either of the phase discriminators described above may be preceded by any digital filter operating on baud spaced samples without affecting the resultant sampling point provided these do not have a transmission zero at the half baud rate. Adaptive precursor taps preceding the DFE will therefore not disturb the sampling point located by the phase control loop.

Whilst a digitally realised phase loop has been described, the analogue equivalent is of course feasible using the same control signal sign ($C_{PT}$). In this case the value of the phase discriminator output (sign ($C_{PT}$)) is used to control the voltage applied to a voltage controlled oscillator thus directly pulling the frequency to maintain phase lock.

Figure 5A:
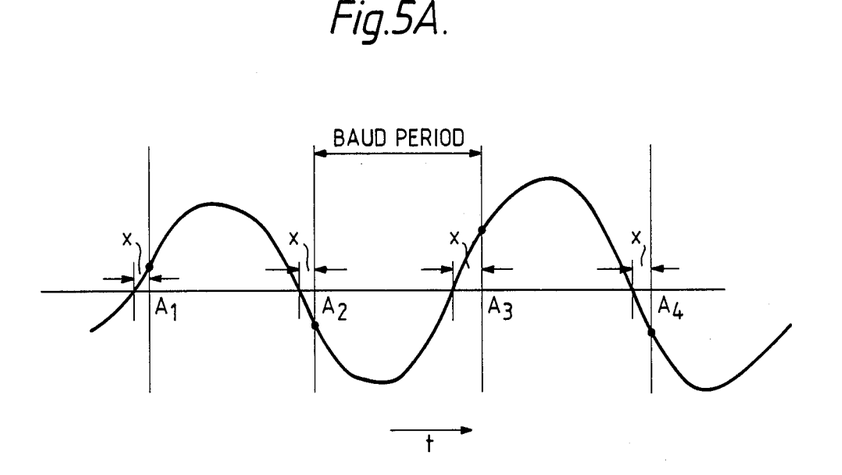
FIG. 5A is a waveform diagram useful in explaining pilot tone transmission.

We now consider the method of sampling time adjustment during the training mode, FIG. 5A. At the receiver sampling point the continuous pilot tone component of received signal appears as FIG. 5A in which the sampling time is in error by an amount x relative to the zero crossings of the pilot. The waveform resembles a sine wave due to the low pass characteristics of the transmitter, channel and receiver low pass filter. Assuming the sampling period and pilot tone are of similar frequency, the sample values taken with an offset (x) as indicated are alternately positive and negative with the same absolute amplitude. In this example odd numbered samples occur shortly after the zero crossings with a positive gradient and even samples occur shortly after the zero crossings with negative gradient.

Figure 5B:
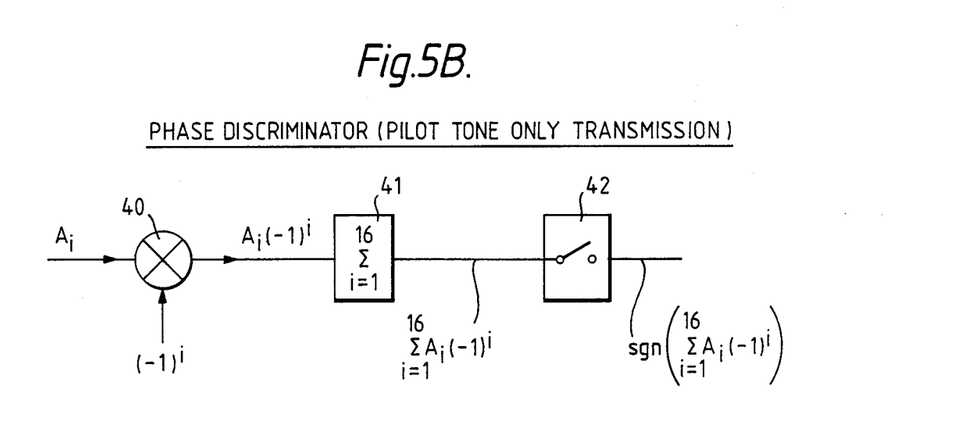
FIG. 5B is a simple block diagram of phase discrimination arrangements used when only pilot tone is being transmitted.

FIG. 5B shows schematically the method for adjusting the timing when only the pilot tone is being received. The input sample values $A_i = A_1, A_2 \ldots A_{16}$ are demodulated by multiplication of the samples alternately by $+1$ and $-1$. In a multiplier 40, the $(-)$ and $(+)$ condition being applied to one input of the multiplier 40. The sampled inputs are applied to the other input, marked $A_i$, of this multiplier. The outputs therefrom are applied to a circuit 41, in which the resulting values are summed over 16 samples and the sign of this sum is the phase discrimator output. The output sign is sampled every 16th symbol and the accumulator 41 then cleared to zero.

Let the i'th sample in a group of 16 be A subscript i, where samples are taken at regular intervals $t = iT$ and the interval T is the inverse of the transmit baud rate. Then the training mode phase discriminator sign (Psign) output every sixteenth symbol is:

$$P\text{sign} = \text{sign}\left[\sum_{i=1}^{i=16} A_i (-1)^i\right]$$

The gradient of the pilot tone can be chosen to be either positive or negative on even or odd numbered samples provided consistency between the train-up phase discriminator and steady state discriminator is maintained. This depends on the alternating phase reference input and the direction chosen for adjustment of the sampling phase if the phase discriminator value is positive.

In the example given consider that the phase control is set to advance the sampling time when the phase discriminator output after the sixteenth sample is positive. Odd numbered samples are inverted by the demodulating multiplier. Then the sampling time would be advanced in steps so as to reduce x to zero. The phase discriminator sign becomes negative as soon as the sampling point precedes the zero crossing, so a state of dynamic equalibrium ensues whereby the sampling time is moved backwards and forwards about the zero crossing maintaining synchronisation with the incoming pilot tone phase.

In a practical duplex system this method may be used during a training period to very rapidly achieve bit synchronisation. This is included in an overall scheme for start-up and training as follows. It is first necessary to wake up the system and to synchronise the two ends so that a known program of simplex transmission bursts may be used as described below whereby each end knows when it is to transmit and when it is to receive.

The wake up signalling used for this purpose can use simple transmitted tones and be detected by tuned threshold comparison. One satisfactory implementation uses a wake up signal generated by repetition of the symbol sequence $++--$. The detection of the sequence is made by feeding the A to D converter output through a filter of response $(1-Z \text{ exponent } -2)$ and then summing the resultant output over 8 input samples after which the sum is compared to a predefined threshold. Wake up is valid if four consecutive summations exceed the preset threshold. The two delays in the filter may be realised using two memory elements of width 12 to store the 2's complement A to D outputs and a 15 bit accumulator is required to do the summation over 8 symbol periods. This accumulator may be time shared with other circuit operations.

The slave end start up sequence control is started from the time at which the wake up signal summation drops below the wake up threshold. In the event of slave end call initiation an identical wake up signal is transmitted in the slave to master direction and the same detection technique employed. The slave end then waits for a return master to slave wake up signal for synchronisation purposes as defined above. Following the wake-up procedure a pilot tone is transmitted from master to slave end for a period of 512 symbol periods. At the slave end adjustment of the sampling phase is made as described above taking one phase step of amplitude 1/32 symbol periods every 16th symbol. Given a worst case phase error of one symbol period and no appreciable noise impairment, the sampling phase is accurate to 1/32 symbol periods at the end of this process. The pilot is then transmitted by the slave to the master end for the same duration. The master end thus adjusts its sampling time in an identical manner to the slave and then locks this phase value relative to its transmission phase. Note that during this period some phase drift will have occurred in the slave transmitter relative to the master transmitter due to crystal oscillator drift but with typical crystal oscillator matching of better than 100 parts per million this will at worst result in an error of 5.12 per cent.

A second cycle of adjustment may then be used in which the pilot tone is transmitted for a period of 256 symbols in each direction in succession with phase steps of 1/128 to fine tune the timing. Thus extremely rapid phase acquisition may be realised which at the exchange end in a full duplex synchronous system will need no further adjustment for the remainder of the connection.

There then follows a training period in which one burst of data is sent in each direction in a simplex manner. Training data plus pilot is transmitted in the master to slave direction and during this period the master canceller is trained with the slave equaliser and slave timing extraction operated. Without the remote signal canceller coefficient perturbation is reduced and the scaler determining the canceller adaption rate (1/C) can be increased to a high value for example 1/256. Simultaneously the slave equaliser receives the data signal and pilot and the equaliser coefficient adaption is enabled following a period for AGC stabilisation. During this period it is advantageous both from the point of view of master canceller training and slave equaliser training to use pseudo random binary data generated for example by the established method of a serial shift register with the input driven from a modulo 2 summation of shifted data elements. A sequence length 511 of bits is suitable in the present application and a period of 8C is sufficient to accurately train master canceller and slave equaliser there 1/C is the canceller scaling factor.

The direction of binary data transmission is then reversed, however, the pilot remains in the master-slave direction and the slave equaliser continues to enable adaption of its pilot tap whilst always making decisions of value zero thus disabling its other coefficients. Thus timing extraction is maintained in the master slave direction controlled by the pilot coefficient sign as defined previously. Adaption of the slave end canceller and master end equaliser is then enabled for the same duration as the previous training burst. Perturbation of the slave canceller coefficients due to the presence of the remote but low level pilot has no significant effect on their accuracy.

Following these two simplex periods of system training steady state full duplex operation with multi-level codes can commence as previously described. The canceller adaption is enabled at a much slower rate using for example the sign only adaption algorithm.

The training sequence involves few states and control can be simply implemented. For example, the transmit and receive control signals may be single bits stored in memory locations stepped through by a counter started at the end of the wake up signalling.

The master station end circuitry and the slave station circuitry can each be implemented in integrated circuit form, and in such case it may be desirable for a "standard" chip to be used which involves the circuit elements common to both the master and the slave station. In such a case the stations would each include one or more additional chips.

I claim:

1. A method for maintaining synchronization between a master terminal and a slave terminal of a digital data transmission system in which data is transmitted over a line between the terminals in an analogue form, which method includes:
    sending from the master terminal to the slave terminal a pilot tone additional to the data, the amplitude of the pilot tone being small compared with that of the data signal, the pilot tone having a frequency with a fixed and known relation to the data bit rate, so that adding the pilot tone does not increase bandwidth;
    sampling the data signal at the slave terminal under the control of a local clock signal;
    detection of the pilot tone being effected concurrently with the sampling of the data signals, said pilot tone detection being effected by a coefficient generation circuit similar to the coefficient generation circuits used in an adaptive decision feedback equalizer and included in an echo canceller at the slave terminal, which coefficient generation circuit comprises a first multiplier fed at a first input thereto with the output of the echo canceller, an accumulator and a second multiplier all connected in series, said second multiplier having a first input fed from an output of the accumulator;
    feeding a locally-generated pilot tone reference signal to second inputs of both said multipliers; and
    adjusting the said local clock signal under control of the pilot tone detected from the incoming data streams, thus maintaining synchronization between the slave terminal and the master terminal.

2. A method as claimed in claim 1, in which wake-up signalling is used to synchronise the two terminals by detection at the slave end of the start or terminal of the wake-up signal;
    said detection using threshold detection and filtering so that a programmed simplex starting procedure can be used.

3. A method as claimed in claim 1, in which a simplex mode of operation involving only the pilot tone is used to rapidly achieve symbol timing extraction using demodulation and summation or an equivalent filtering process to estimate the direction of any pilot tone phase error.

4. A method as claimed in claim 1, including:
  using a simplex mode of operation preceding full duplex operation for training an echo canceller in the absence of a disturbing remote data signal;
  transmitting a data sequence alternately in the two directions of transmission i.e., from master to slave and from slave to master; and
  maintaining timing synchronisation between the master and slave terminals by transmitting the pilot tone only in the master-slave direction independent of the direction of the training sequence.

5. A method as claimed in claim 1, in which synchronization words are transmitted from the master terminal to the slave terminal at predetermined intervals, each said synchronization word containing several consecutive zero amplitude signals, in which adjustment of timing extraction under steady state conditions is effected at the slave terminal, which adjustment is effected in small steps made immediately following the transmission of the last zero amplitude symbol in a said synchronization word such that any error in cancellation accuracy which may occur due to the sampling shift is substantially reduced.

6. A data transmission system which embodies the method of claim 1,
  in which each of said terminals is implemented in integrated circuit form.

* * * * *